(12) United States Patent
Iwatsuka

(10) Patent No.: US 11,729,325 B2
(45) Date of Patent: Aug. 15, 2023

(54) IMAGE FORMING DEVICE AND NON-TRANSITORY COMPUTER-READABLE RECORDING MEDIUM CONTAINING COMPUTER-EXECUTABLE INSTRUCTIONS THEREFOR

(71) Applicant: BROTHER KOGYO KABUSHIKI KAISHA, Nagoya (JP)

(72) Inventor: Kentaro Iwatsuka, Gifu (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/399,306

(22) Filed: Aug. 11, 2021

(65) Prior Publication Data

US 2022/0060593 A1 Feb. 24, 2022

(30) Foreign Application Priority Data

Aug. 24, 2020 (JP) .................................. 2020-140732
Aug. 24, 2020 (JP) .................................. 2020-140733

(51) Int. Cl.
*H04N 1/00* (2006.01)
*H04N 1/44* (2006.01)

(52) U.S. Cl.
CPC ..... *H04N 1/00464* (2013.01); *H04N 1/00206* (2013.01); *H04N 1/00413* (2013.01); *H04N 1/444* (2013.01); *H04N 1/0044* (2013.01)

(58) Field of Classification Search
None
See application file for complete search history.

(56) References Cited

U.S. PATENT DOCUMENTS

| 2010/0271666 | A1 | 10/2010 | Kimura | |
|---|---|---|---|---|
| 2017/0366701 | A1* | 12/2017 | Ooba | H04N 1/00076 |
| 2018/0213019 | A1* | 7/2018 | Morita | G06F 16/9566 |
| 2020/0404108 | A1* | 12/2020 | Saito | G06F 3/1288 |

FOREIGN PATENT DOCUMENTS

| JP | 2005318654 | * | 11/2005 | G06F 3/12 |
|---|---|---|---|---|
| JP | 2010-258771 A | | 11/2010 | |
| JP | 2012048442 | * | 3/2012 | H04N 1/00 |
| JP | 2014197813 | * | 10/2014 | H04N 7/15 |
| JP | 2015179890 | * | 10/2015 | H04N 1/00 |
| JP | 2019016223 | * | 1/2019 | G06F 3/12 |

* cited by examiner

*Primary Examiner* — Beniyam Menberu
(74) *Attorney, Agent, or Firm* — Scully, Scott, Murphy & Presser, PC

(57) ABSTRACT

An image forming device according to aspects of the present disclosure, including a communication interface, a user interface, and a controller. The controller configured to perform a remote display control of transmitting remote data to an information processing device. The remote data is data making a browser of the information processing device display a remote screen reproducing an operation screen of the image forming device. The controller is configured to perform obtaining decision information used to determine a mode of the remote screen and determining the mode based on the obtained decision information. The controller displays the remote screen having the display content of the mode on the browser by transmitting the remote data in accordance with a restriction parameter.

28 Claims, 11 Drawing Sheets

IMAGE FORMING DEVICE AND NON-TRANSITORY COMPUTER-READABLE RECORDING MEDIUM CONTAINING COMPUTER-EXECUTABLE INSTRUCTIONS THEREFOR

CROSS-REFERENCE TO RELATED APPLICATIONS

This application claims priority under 35 U.S.C. § 119 from Japanese Patent Applications No. 2020-140732 and No. 2020-140733, both filed on Aug. 24, 2020. The entire subject matters of the applications are incorporated herein by reference.

BACKGROUND

Technical Field

The present disclosures relate to a technique supporting users who operate image forming devices.

Related Art

There has been known an image forming device equipped with a display configured to display a preview screen showing an image immediately after scanning. In such an image forming device, when a preview screen for an original document having a relatively high security level is displayed, the preview screen is displayed in a degraded state, thereby increasing the security strength.

SUMMARY

Incidentally, there are cases where a user of an image forming device receives support for operations of the device from a serviceperson. In such a case, it is difficult for the serviceperson to grasp a current operation status of the image forming device by the user if the support is provided by telephone or e-mail as in the past, and it may be difficult for the serviceperson to provide effective support to the user.

According to aspects of the present disclosures, there is provided an image forming device, including a communication interface, a user interface, and a controller. The controller is configured to perform a remote display control of transmitting remote data to an information processing device through the communication interface, the remote data being data making a browser provided to the information processing device display a remote screen reproducing an operation screen to be displayed on the user interface, obtaining decision information, and determining display mode based on the obtained decision information, the display mode being a mode of displaying a display content on the remote scree, and, in the remote display control, transmitting the remote data, the remote screen having the display content of the display mode, the display mode being a mode determined in the determining, the remote data being data making the browser display the remote screen.

According to aspects of the present disclosures, there is provided a non-transitory computer-readable recording medium for an image forming device provided with a communication interface, a user interface, and a controller, the recording medium containing computer-executable instructions which cause, when executed by the controller, the image forming device to perform a remote display control of transmitting remote data to an information processing device through the communication interface, the remote data being data making a browser provided to the information processing device display a remote screen reproducing an operation screen to be displayed on the user interface, obtaining decision information, and determining a display mode based on the obtained decision information, the display mode being a mode of displaying a display content on the remote screen, and in the remote display control, by transmitting the remote data, the remote screen having the display content of the display mode determined in the determining, the remote data being data making the browser display the remote screen.

DETAILED DESCRIPTION OF THE EMBODIMENTS

First Embodiment

Figure 1:
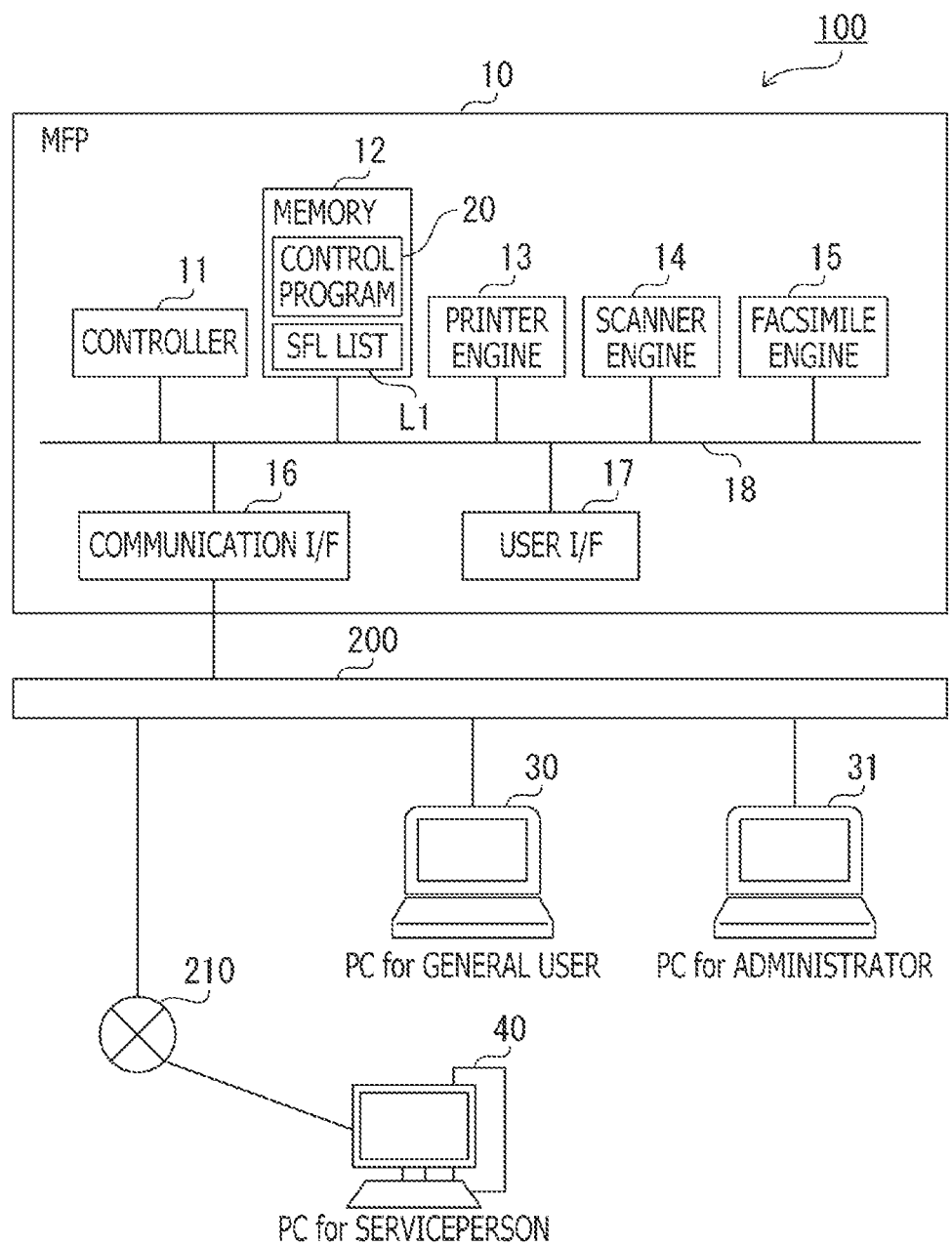
FIG. 1 schematically shows a configuration of an image forming system according to aspects of the present disclosures.

An image forming system 100 according to a first embodiment will be described with reference to the accompanying drawings. The image forming system 100 shown in FIG. 1 is equipped with an MFP 10, a PC 30 for general users, a PC 31 for an administrator, and a PC 40 for a serviceperson. The MFP 10, the PC 30 and the PC 31 are connected to a LAN 200 and are configured to communicate with each other through the LAN 200. Further, the LAN 200 is connected to the Internet 210, and the PC 40 for serviceperson is connected to the Internet 210.

Each of the PCs 30, 31, and 40 is equipped with a CPU, a memory, a user IF, a display, and a network I/F (interface). In the memory of the PC 40, a browser program is stored. The browser program is a program configured to connect to a web server via the Internet 210 and display web page data managed by the web server on the display.

Among the PCs 30, 31, 40, the general user PC 30 is a PC used by users who use the MFP 10 via the LAN 200. Concretely, by logging in to the MFP 10 through operations on any of the PCs 30, 31 and 40, the user can use the MFP 10. The administrator's PC 31 is a PC used by an administrator who is authorized to manage the MFP 10 on the LAN 200. The serviceperson's PC 40 is a PC used by the serviceperson who provides services such as maintenance and operation support of the MFP 10.

The MFP 100 is equipped with a controller 11, a memory 12, a printer engine 13, a scanner engine 14, a facsimile engine 15, a communication I/F 16, a user I/F 17, and a bus 18.

The communication I/F 16 connects the MFP 10 to the LAN 200 and the Internet 210 in accordance with a particular communication protocol. The user I/F 17 is an interface between the user who directly operates the MFP 10 and the controller 11, the controller 11 being, for example, a touch panel or operation keys.

The printer engine 13 is configured to perform a print operation to print images on a recording medium such as a sheet or a disk. A recording method of the printer engine 13 can be an inkjet method, an electrophotographic method, and the like. The scanner engine 14 is configured to perform a scan operation to read (scan) images recorded on a document and generate image data representing the read image. The facsimile engine 15 is configured to perform a fax (i.e., a facsimile) operation to send and receive image data in a method compliant with the facsimile protocol. The MFP 10 may also be configured to perform a composite operation in which multiple operations are combined.

The controller 11 is equipped with a CPU, an ASIC (Application Specific Integrated Circuit), etc. The controller 11 is configured to control operations of the printer engine 13, the scanner engine 14, facsimile engine 15, the communication I/F 16, and the user I/F 17 of the MFP 10. The memory 12 has a data storage area. The data storage area is an area for storing data and the like, which are necessary for executing programs. The memory 12 is provided with a RAM, a ROM, an SSD, an HDD, and the like. It is noted that a buffer provided to the controller 11 and used during the execution of various programs, can also be regarded as a part of the memory 12. The memory 12 may be a storage medium that can be read by the controller 11. A storage medium readable by the controller 11 is a non-transitory medium. The non-transitory medium may include, in addition to the above examples, recording media such as a CD-ROM, a DVD-ROM, etc. The non-transitory medium is also a tangible medium. On the other hand, an electrical signal carrying a program that is downloaded from a server or the like on the Internet 210 is a computer-readable signal medium, which is a kind of computer-readable medium, but is not included in the non-transitory computer-readable storage medium.

In the memory 12, a control program 20 is stored as a program that can be executed by the controller 11. In the following description, the controller 11 executing a program may be referred to simply by a name of the program as well. For example, a description "the control program 20 does . . . " is used in the sense of "the controller 11 executing the control program 20 does . . . ." In the present embodiment, processes of the controller 11 according to the instructions described in the program will be mainly indicated. That is, processes of "determining," "extracting," "selecting," "calculating," "deciding," "specifying," "obtaining," "receiving," "controlling," and the like in the following description represent processing of the controller 11. It is noted that the expression "obtaining" is used in a concept that does not require a request therefor. Therefore, a process of receiving data without a request by the controller 11 is also included in the concept of "obtaining of data by the controller 11." Further, "data" in this specification is represented by a bit string that can be read by the controller. Further, data with the same substantive meaning content but different formats will be treated as the same data. The same applies to "information" in this specification.

The control program 20 controls the printer operation using the printer engine 13, the scanner operation using the scanner engine 14, and the facsimile operation using the facsimile engine 15. The control program 20 also functions as an EWS (Embedded Web server) which a kind of a web server. Functioning as the EWS, the control program 20 is capable of causing a browser screen to be displayed on the browser provided to each of the PCs 30, 31, and 40. Concretely, as the user can start a browser on the PC and enter a URL that specifies the control program 20 (i.e., the EWS), the user can download web page data generated by the control program 20 and display the EWS screen, which is the browser screen, on the browser.

In the memory 12, an SFL (Secure Function Lock) list L1 is stored. In the SFL list L1, whether an execution is allowed or not for each of various operations and functions of the MFP 10 is set.

Figure 2A:
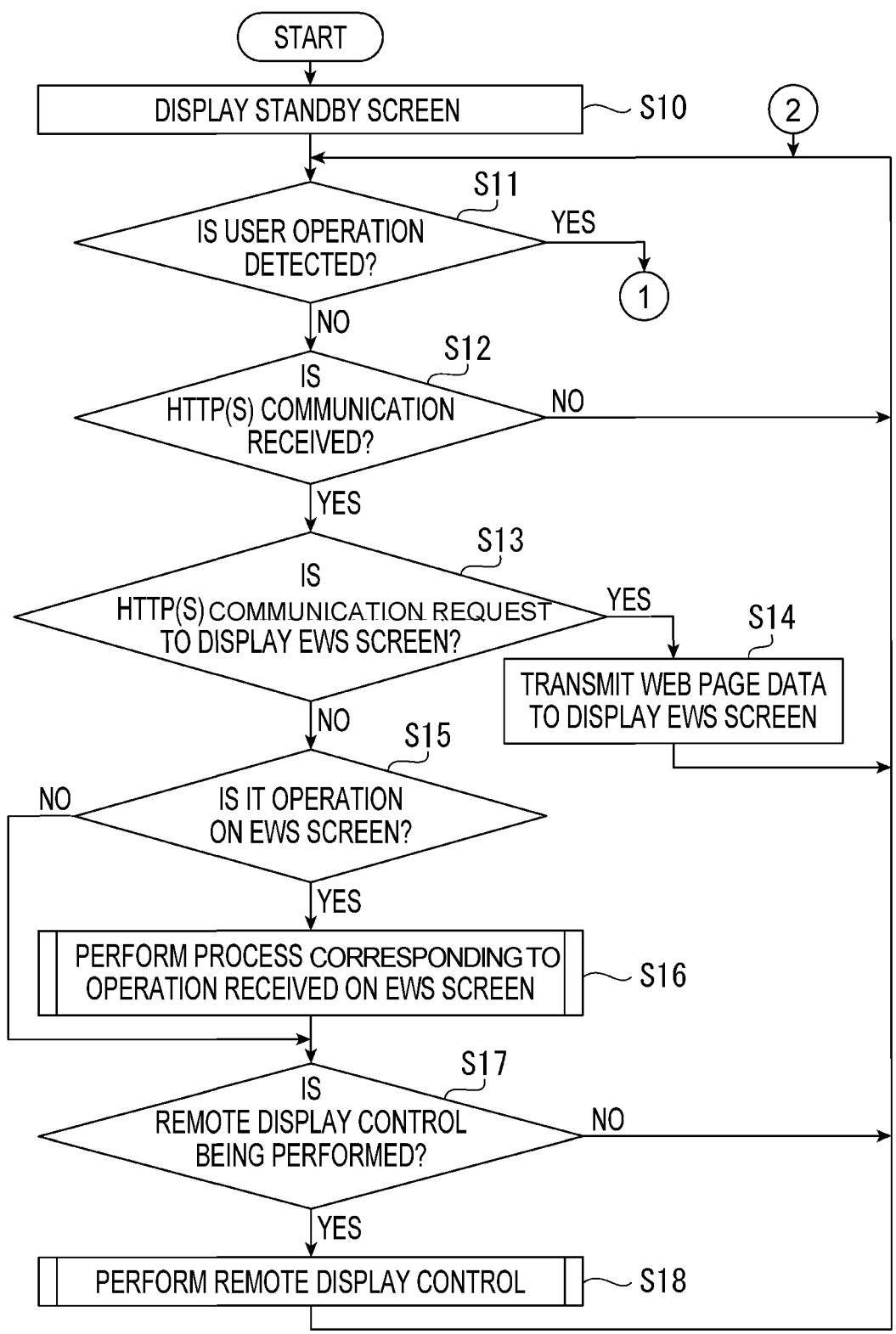
FIGS. 2A and 2B show a flowchart illustrating a process performed by a controller of an MFP according to aspects of the present disclosures.
Figure 2B:
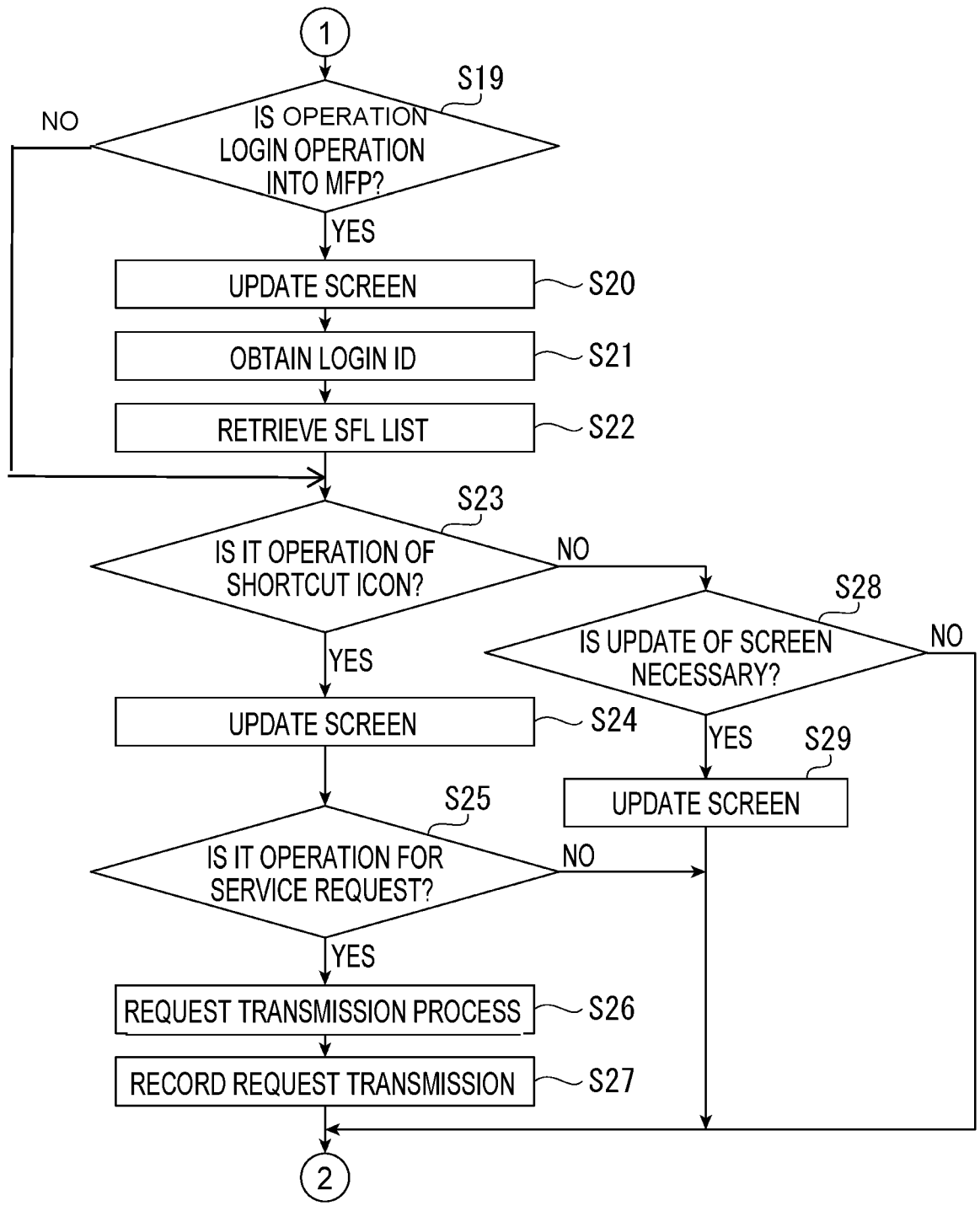

Next, processes to be executed by the controller 11 will be described with reference to the drawings. FIGS. 2A and 2B show a flowchart illustrating processes performed by the controller 11 of the MFP 10 in accordance with the control program 20.

In S10, the controller 11 displays a standby screen on the user I/F 17. The standby screen includes shortcut icons as operation icons for designating respective operations of the MFP 10 and unregistered icons. For example, the standby screen includes shortcut icons to designate the "Fax" operation, the "Copy" operation, the "Scan" operation, and a "2-in-1 Copy" operation, and a "particular document copy" operation. In the present embodiment, the particular document copy operation is an operation to perform a function to copy an invoice. It is noted that the particular document copy operation may be an operation to realize a function to copy documents with a high level of security, such as automobile licenses, passports, insurance cards and the like. Each shortcut icon is basically not a pre-set icon that is set in advance from the time of shipment of the MFP 10, but an icon that is arranged in place of an unregistered icon when the user performs a registration operation for the unregistered icon.

In S11, the control determines whether a user operation to the user I/F 17 is detected. When the user operation is detected (S11: YES), the control by the controller 11 proceeds to S19. In S19, the control determines whether the user operation to the user I/F 17 is a login operation to the MFP 10. When the control determines that the login operation is performed (S19: YES), the control proceeds to S20 and updates the standby screen to a screen corresponding to the login operation.

Figure 3:
FIG. 3 shows an example of an SFL list.

In S21, the control receives the login ID which is input via the user I/F 17. In S22, the control retrieves the SFL list L1 corresponding to the login ID received in S21. In the SFL list L1, for each "login ID" that identifies a logged in user of the MFP 10, restriction parameters indicating whether the operations of the MFP 10, namely, the "Print" operation, the "Copy" operation, and the "Fax" operation are restricted, respectively, and whether a display restriction on a "remote display control" which is a function of the MFP 10 is restricted, are set. FIG. 3 shows an example of the SFL list L1. In the SFL list L1 shown in FIG. 3, checkboxes are checked for the items indicating the operations or functions for which restrictions are set, and the checkboxes are not checked for the items indicating the operations or functions for which no restrictions are set. For example, for "User A" who is a logged-in user, a restriction is set for the "Copy" operation in the SFL list L1, so when "User A" is logged in to the MFP 10, the MFP 10 does not execute the copy operation. The control temporarily stores the restricted parameters read from the SFL list L1. The value of the SFL list L1 can be set on the EWS screen described below.

The controller 11 may be configured to perform the obtaining process in accordance with the operation received via the user I/F 17 of the MFP 10. In this case, the controller 11 displays a setting screen enabling the user to set the contents of the SFL list L1 on the user I/F 17. Then, according to the user operation performed on the setting screen, the controller 11 performs the obtaining process to set the contents of the SFL list L1 is executed.

When the control executes S22, or when the control determines that the login operation is not performed (S19: NO), the controller 11 proceeds to S23. In S23, the controller 11 determines whether the operation on the user I/F 17 is an operation on a shortcut icon or not. When it is determined that the operation on the user I/F 17 is an operation on a shortcut icon (S23: YES), the control proceeds to S24. In S24, the control updates a screen displayed on the user I/F 17 in accordance with the operated shortcut icon. For example, when the user operates the shortcut icon designating the "Copy" operation, the copy operation by the MFP 10 is executed. When it is determined that the operation on the user I/F 17 is not an operation on a shortcut icon (S23: NO), the control proceeds to S28 to determine whether the screen needs to be updated as the user I/F 17 is operated. When it is determined that the screen needs to be updated (S28: YES), the control proceeds to S29 and updates the screen according to the operation received via the user I/F 17. When it is determined that the screen does not need to be updated (S28: NO), or when the control completes the process of S29, the control returns to S11.

In S25, the controller 11 determines whether the operation on the user I/F 17 is an operation corresponding to a service request. The service request is a request to ask a serviceperson to perform a remote display control for a remote support of the MFP 10. Concretely, the remote display control is a control to display a remote screen, which is a virtual screen generated and displayed by virtually generating a display of the user I/F 17 of the MFP 10, on the browser of the PC. In the remote display control, an operation input by the user (e.g., the serviceperson) on the remote screen displayed on the PC results in the same result as if the same operation input is made to the user I/F 17 of the MFP 10. When it is determined that the operation on the user I/F 17 is not an operation corresponding to the service request (S25: NO), the control returns to S11.

When it is determined that the operation on the user I/F 17 is an operation corresponding to the service request (S25: YES), the controller 11 proceeds to S26 to perform a request transmitting process to make a service request. In the present embodiment, as a service request, a command to request the start of the remote display control for the remote support is sent to the PC 40 for the serviceperson via the communication I/F 16. When an e-mail address of the serviceperson in the storage 12, the controller 11 may send the support request by e-mail to the e-mail address stored in the storage 12. Optionally or alternatively, when a telephone number of the serviceperson is stored in the storage 12, the controller 11 may display the telephone number of the serviceperson on the user I/F 17 in S26. In such a case, the user of the MFP 10 can make a telephone call to the telephone number displayed on the user I/F 17, thereby making the support request to the serviceperson.

In S27, the controller 11 stores that a service request has been transmitted to the serviceperson.

Returning to S11, when the controller 11 does not detect any user operations, the controller 11 proceed to S12 to determine whether data through an HTTP(S) communication, that is, a data communication according to the protocol of the HTTP(S), has been received. When it is determined that no data through the HTTP(S) communication has been received, the controller 11 returns to S11.

When it is determined that data though the HTTP(S) communication has been received (S12: YES), the controller 11 proceeds to S13 to determine whether the data though the HTTP(S) communication is a display request to display an EWS screen. The EWS screen is a browser screen that is displayed by the browser using web page data generated by the control program 20. When the HTTP(S) communication is the request to display the EWS screen, the controller 11 transmits the web page data to display the home screen of the EWS screen to the PC which is a sender of the display request. Upon completion of S14, the controller 11 returns to S11.

Executing S14, for example, in a state where the home screen of the EWS screen is displayed on the PC 40 for the serviceperson, by entering the password in a login password entry field on the screen displayed on any of the PCs 30, 31, 40 and clicking a login button, the user can receive the various functions provided by the control program 20. The functions that can be provided from the EWS screen include the remote display control for remotely operating the MFP 10 via a remote screen displayed on each of the PCs 30, 31, 40, and a process of updating the items recorded in the SFL list L1. When the user selects the remote display control, for example, on the EWS screen after which is displayed immediately after the login, a request to start the remote display control is transmitted to the MFP 10 by the HTTP(S) communication.

On the other hand, when it is determined that the HTTP(S) communication is not a display request to display the EWS screen (S13: NO), the controller 11 proceeds to S15 to determine whether the HTTP(S) communication is a request in accordance with an operation on the EWS screen. When the user performs an operation on the EWS screen while the EWS screen is being displayed on the PC, which is the sender of the display request, in S14, an HTTP(S) request corresponding to the operation on the EWS screen is transmitted to the MFP 10. Therefore, when it is determined that the HTTP(S) communication is a request in accordance with an operation on the EWS screen (S15: YES), the controller 11 proceeds to S16 and a process in accordance with the operation received on the EWS screen is executed. When it is determined that the HTTP(S) communication is not a request in accordance with an operation on the EWS screen (S15: NO), the control proceeds to S17.

Figure 4:
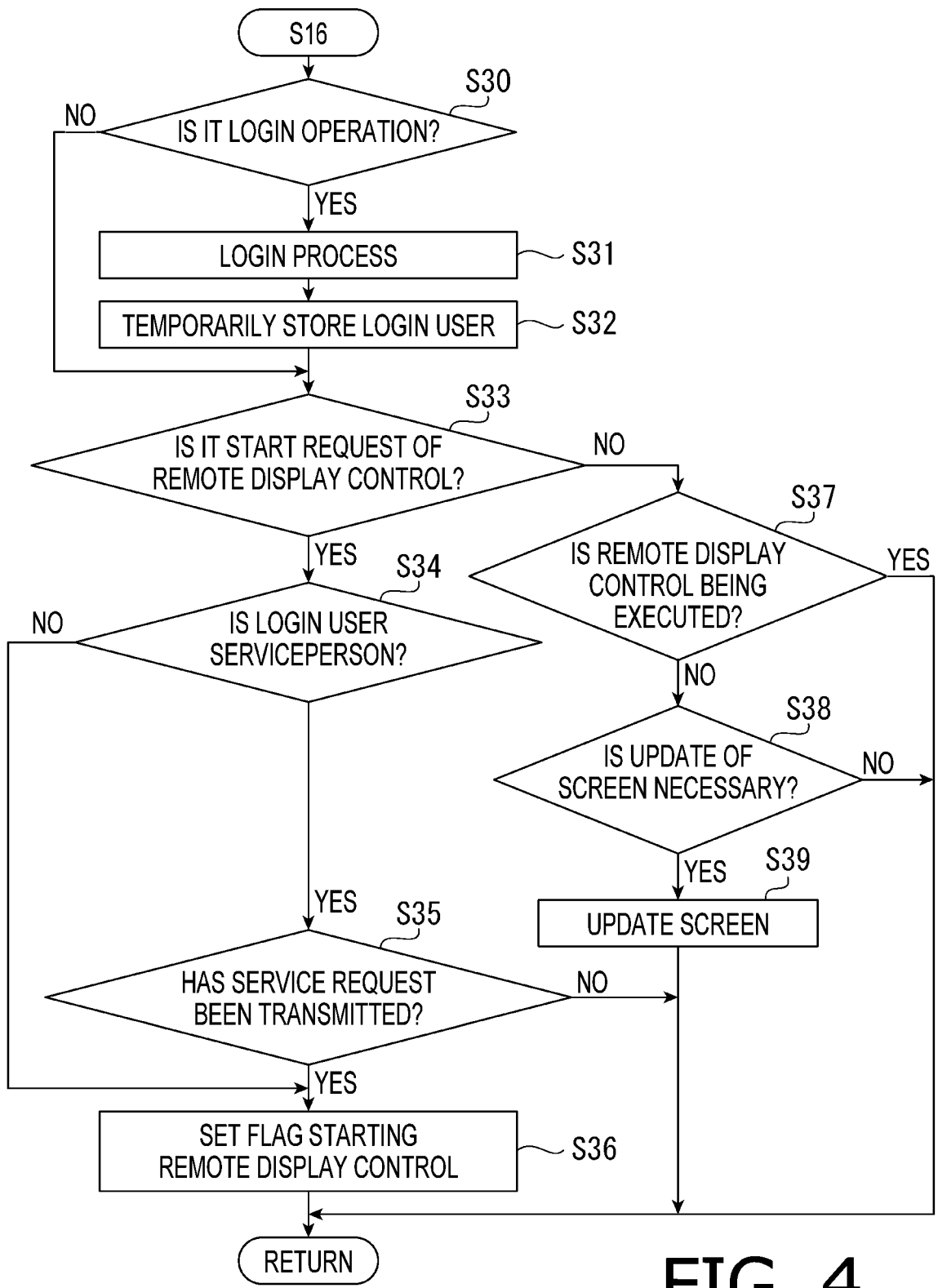
FIG. 4 is a flowchart illustrating a process performed in S16 of FIG. 2.

FIG. 4 shows a flowchart illustrating a process performed in S16 of FIG. 2. In S30, the controller 11 determines whether the HTTP(S) request corresponds to a login operation on the EWS screen. When it is determined that the HTTP(S) request corresponds to the login operation on the EWS screen (S16: YES), the control proceeds to 531. In 531, the controller 11 transmits the Web page data used to display an updated EWS screen to the PC of the sender of the request as the login process.

In S32, the controller 11 temporarily stores the login user who performed the login operation on the EWS screen in the storage 12. Concretely, the controller 11 stores the user, who performed the login operation, in the storage 12 according to the "user name" included in the HTTP(S) request received in conjunction with the login operation on the EWS screen.

When completing S32, or it is determined that the HTTP(S) request does not correspond to the login operation on the EWS screen (S30: NO), the controller 11 proceeds to S33. In S33, determine whether or not the HTTP(S) request is a request to start the remote display control. When it is determined that the HTTP(S) request is the request to start the remote display control (S33: YES), the controller 11 proceeds to S34 and determines whether the login user stored in S32 is the serviceperson. When it is determined that the login user is the serviceperson (S34: YES), the control proceeds to S35 to determine whether a service request has been transmitted to the serviceperson. When the service request has not been transmitted to the serviceperson, it is possible that the received request to start the remote display control is an error transmission, the controller 11 once terminates the process shown in FIG. 4. In this case, the remote display control is not started. On the other hand, when it is determined that the service request has been transmitted to the serviceperson (S35: YES), the received request to start remote display control is proper, the controller 11 proceeds to S36 and sets a flag indicating the start of the remote display control to effective. Then, the controller 11 proceeds to S17 of FIG. 2. When an operation icon indicating the end of the remote display control is operated on the remote screen, the flag set in S36 will be changed from valid to invalid.

When the login user is not a serviceperson, but an administrator or a general user logged in to the MFP 10 (S34: NO), the control proceeds to S36 and sets the flag indicating that remote display control is to be started to effective. That is, when the login user is an administrator or a general user, it can be determined that the remote display control is not aimed to the remote support, and therefore, the controller 11 does not determine whether the service request has been transmitted. After completing S36, the control proceeds to S17 of FIG. 2.

When the HTTP(S) communication is not a request to start the remote display (S33: NO), the control proceeds to S37 to determine whether the remote display control is in progress. When the flag designating the start of the remote display control has already been set to valid in S36, it is determined that the remote display control is in progress (S37: YES), and the controller 11 proceeds to S17 of FIG. 2. On the other hand, when the flag designating the start of the remote display control has been set to invalid, it is determined that the remote display control is not in progress (S37: NO), and the controller 11 proceeds to S38. In S38, the controller 11 determines whether the update of the EWS screen is necessary. When it is determined that the update of the EWS screen is necessary (S38: YES), the controller 11 proceeds to S39 and transmits the web page data for displaying the updated EWS screen on the browser to the PC which is the sender of the HTTP(S) communication. When S39 is completed, or when it is determined that the update of the EWS screen is unnecessary (S38: NO), the control proceeds to S17 of FIG. 2.

Returning to FIG. 2, the controller 11 determines whether the remote display control is currently being executed in S17. Concretely, when the control proceeds to S17 via S36 in FIG. 4 or after making an affirmative determination in S37, the controller 11 makes an affirmative determination in S17 and proceeds to S18 since the flag indicating that remote display control has been started is set to be valid. On the other hand, when the controller 11 makes a negative determination in S35, or when the controller 11 proceeds to S17 via S38 and S39 after making a negative determination in S37, the control returns to S11 after making a negative determination in S17 since the flag indicating that remote display control has been started is set to invalid.

Figure 5:
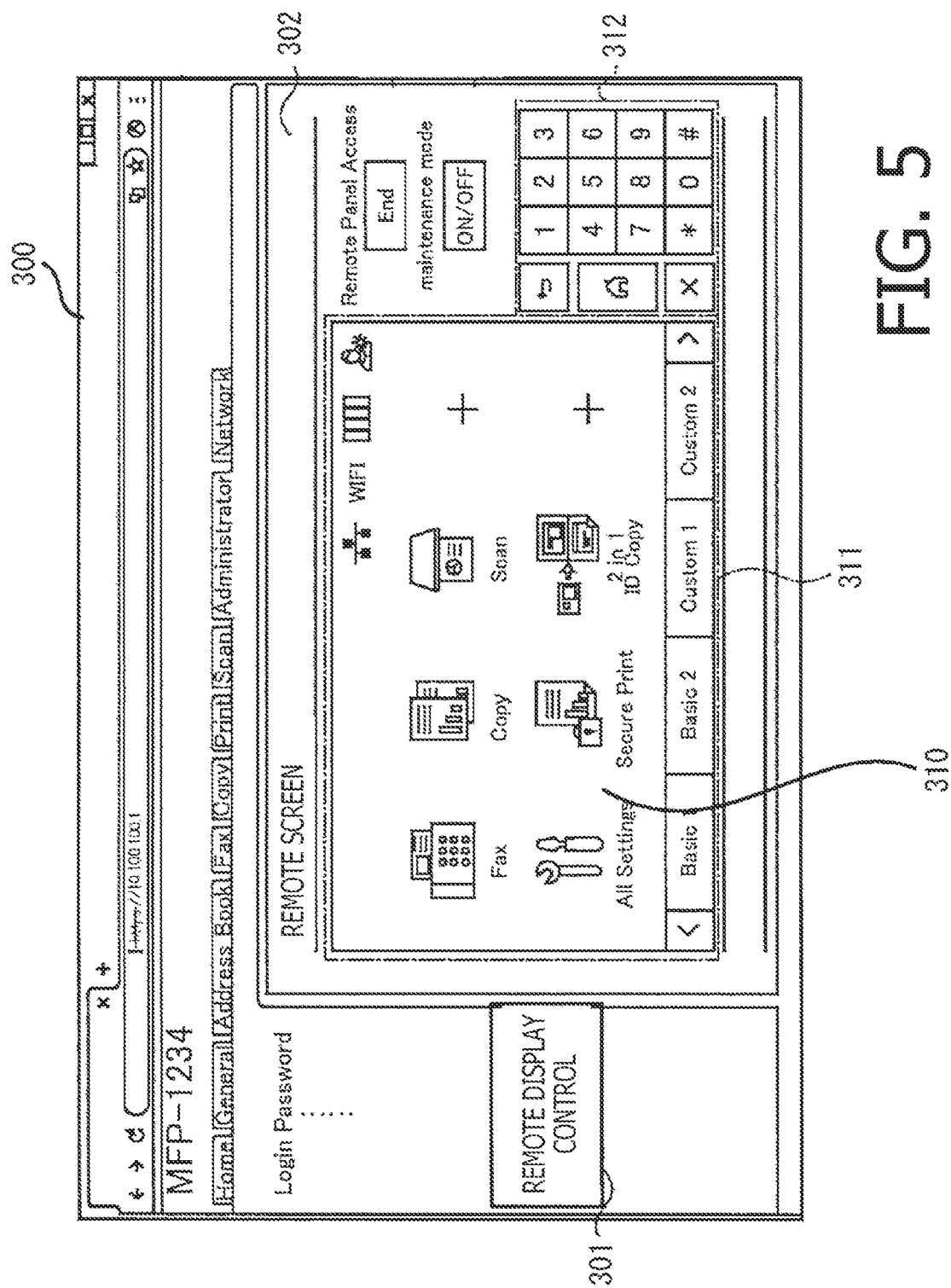
FIG. 5 shows an example of a browser screen.

In S18, the controller 11 executes the remote display control. FIG. 5 shows a browser screen 300 which is displayed on one of the PCs 30, 31 and 40 as the remote display control is executed when the standby screen is displayed on the user I/F 17. The browser screen 300 includes an item display area 301 for displaying web page data provided by the control program 20 and a detail display area 302. The item display area 301 is an area in which items indicating selectable functions which can be selected on the EWS screen are displayed. In the example shown in FIG. 5, the item "Remote Display Control" indicating the remote display control is displayed in an activated manner since the remote display control is selected on the EWS screen.

The detailed display area 302 is an area where a screen corresponding to the selected function is displayed. In the example shown in FIG. 5, a remote screen 310 which is an image reproducing the user I/F 17 is displayed in the detailed display area 302. Concretely, the remote screen 310 includes a panel display image 311, which corresponds to a standby screen, and virtual key icons 312, which correspond to operation keys, respectively. Therefore, the remote screen 310 contains shortcut icons which are the same as the shortcut icons displayed on the standby screen.

Figure 6:
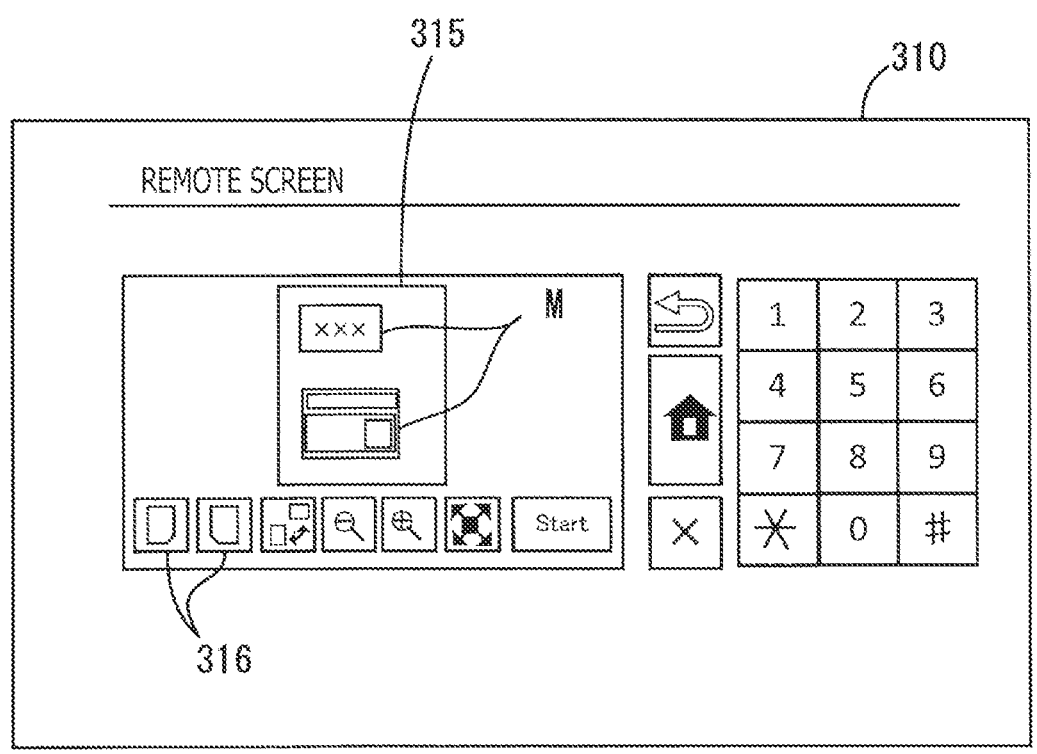
FIG. 6 shows an example of a remote screen.

The remote screen shown in FIG. 6 is the remote screen 310 that is displayed on any of the PCs 30, 31 and 40 when the user causes the MFP 10 to execute the copy operation by operating the standby screen displayed on the user I/F 17 and display a preview screen of the read document on the user I/F 17. The remote screen 310 includes a preview screen 315 and operation icons 316. The preview screen 315 is a screen displaying a document that has been scanned by the scan operation of the MFP 10. The operation icons 316 are icons that respectively receive instructions for processing (e.g., enlarging, reducing, reversing or the like) the document displayed on the preview screen 315.

In the above-mentioned remote display control, when the remote screen 310 containing an image with a high security level, such as a certificate or an ID card, is displayed on the serviceperson's PC 40, there is a concern that a desired security level may not be maintained for the image. For example, in the example of FIG. 6, the document image M corresponding to the ID card is included in the remote screen 310, and there is a concern that the security level is lowered since the remote screen 310 is displayed on the serviceperson's PC 40. Therefore, according to the present embodiment, by setting a restriction on the display of the remote screen 310 in the remote display control, the reduction of the security level for the document is suppressed.

Next, a process related to the remote display control performed in S18 of FIG. 2 will be described referring to FIG. 7.

In S40, the controller 11 determines whether the HTTP(S) communication is an HTTP(S) request with operation coordinates. The operation coordinates are generated in response to the operation of an icon on the remote screen 310, and represent information indicating the coordinates on the remote screen 310 at which the operation is performed. When it is determined that the HTTP(S) communication is not the HTTP(S) request with the operation coordinates (S40: NO), the controller 11 proceeds to S41 to generate raster data corresponding to the operation screen currently displayed on the user I/F 17. It is noted that, since the user cannot operate the icons on the remote screen 310 when the remote screen 310 is not displayed on the PC that requested the remote display control, the controller 11 makes a negative determination in S40 and proceeds to S41.

In S46, the controller 11 determines whether the user who is currently logged in on the EWS screen is a serviceperson. In the present embodiment, when the serviceperson is currently logged in, it is determined that the remote display control is for the purpose of remote support. It is because, when the operation of the MFP 10 is supported via the remote screen 310 displayed by the remote serviceperson's PC 40, users on the serviceperson's PC 40 are regarded as unspecified users and the possibility of lowering the security level is high, and the display of the remote screen 310 should be restricted. Concretely, when the login user stored in S32 of FIG. 4 is the serviceperson, the controller 11 makes the affirmative determination in S46 (S46: YES), and when the login user stored in S32 is the administrator or the general user, the controller 11 makes a negative determination in S46 (S46: NO).

In addition to the above, when the IP address of the sender of the HTTP(S) request is that of the serviceperson's PC 40, the controller 11 may determine that the remote screen display is for the purpose of remote support (S46: YES), while when the IP address is that of the general user's PC 30 or the administrator's PC 31, the controller 11 may determine that the remote screen display is not for the purpose of remote support (S46: NO).

When determining that the user currently logged in on the EWS screen is a serviceperson (S46: YES), the controller 11 proceeds to S47. In S47, the controller 11 determines whether the screen currently displayed on the user I/F 17 is a preview screen in the scan operation. When determining that the screen currently displayed on the user I/F 17 is the preview screen (S47: YES), the controller 11 proceeds to S48. In S48, the controller 11 modifies the raster data generated in S41 with restrictions based on the restriction parameters read from the SFL list L1, and generates web page data including the modified raster data. In other words, in the present embodiment, display restrictions are applied only to the preview screen. At this time, the restriction parameters to be loaded are the restriction parameters that were retrieved in S22 of FIG. 2 in accordance with the logged-in user.

Figure 8:
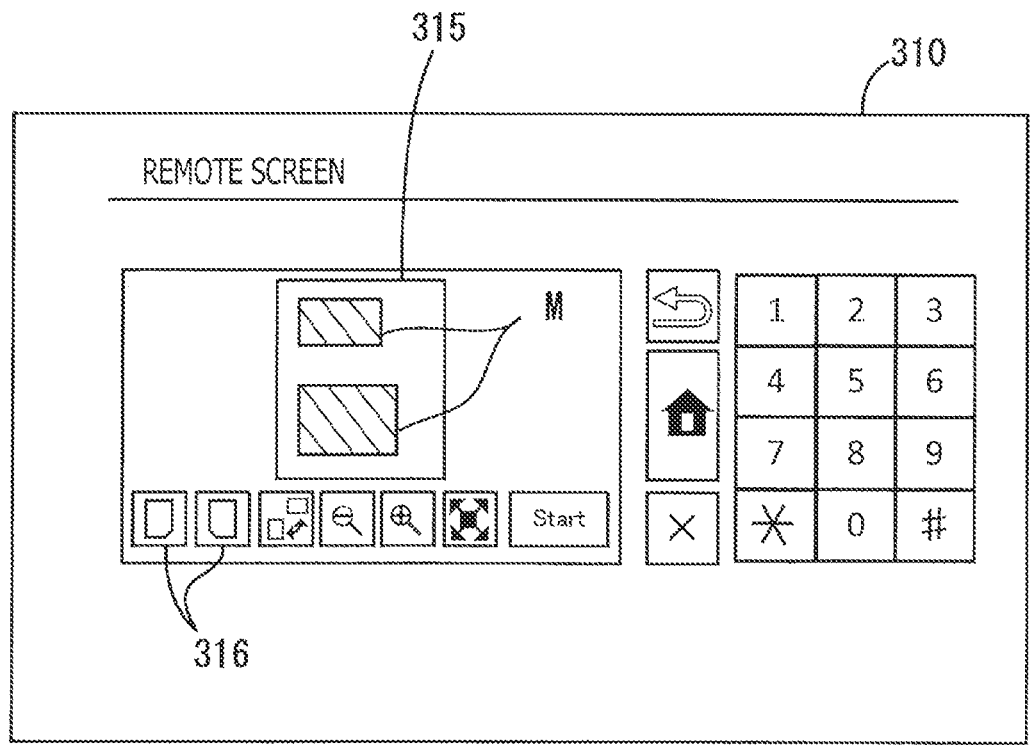
FIG. 8 shows an example of the remote screen with display restrictions.
Figure 9:
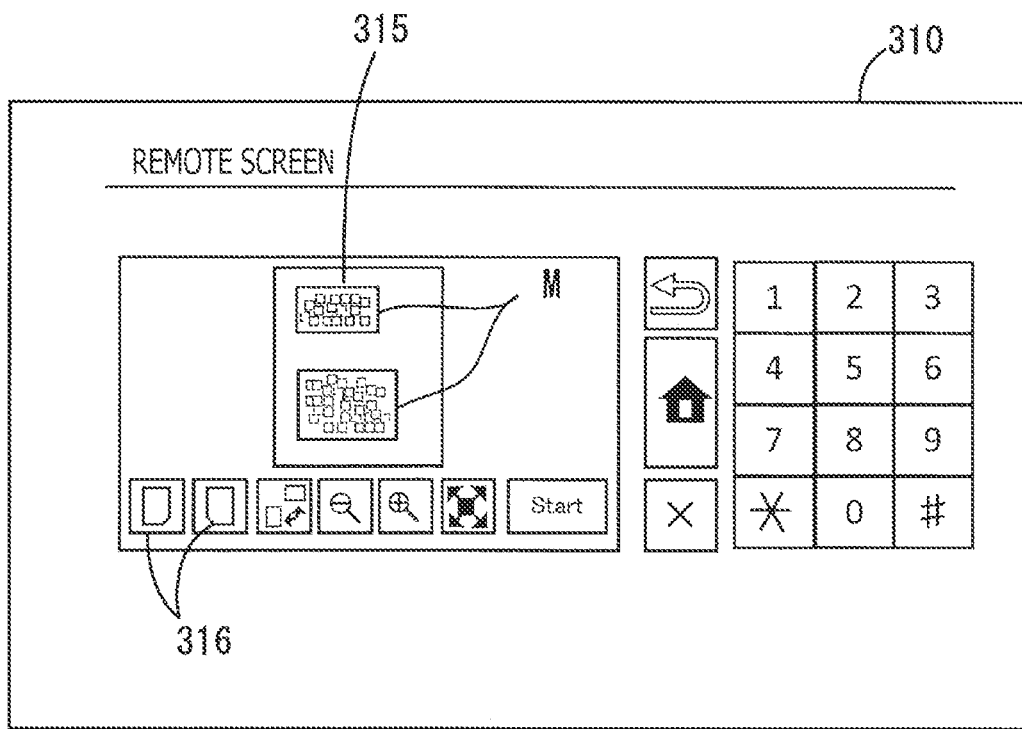
FIG. 9 shows an example of the remote screen with display restrictions.

In the present embodiment, the presence or absence of the display restrictions on the remote screen 310 can be set in three modes according to the restriction parameters recorded in the SFL list L1. In FIG. 3, an "Off" mode is a mode in which the document image M is displayed as it is, that is, without any restriction, when the preview screen 315 is displayed on the remote screen 310. An "On" mode and a "Blur" mode are modes in which the document image M is displayed with restrictions when the preview screen 315 is displayed on the remote screen 310. The "On" mode is a mode in which the document image M is hidden when the preview screen 315 is displayed on the remote screen 310. Concretely, as shown in FIG. 8, in the "On" mode, the document image M is grayed out on the preview screen 315, so that the document image M is hidden. On the other hand, in the "Blur" mode, when the preview screen 315 is displayed on the remote screen 310, the document image M is displayed with a blur process being applied. As shown in FIG. 9, in the "Blur mode, the document image M is displayed in a blurred manner on the preview screen 315 so that the document image M is substantially hidden.

For example, a method of recognizing the document image M from the raster data may be configured to recognize the same using a well-known image process such as a pattern detection method. Further, a method of displaying the document image M in the grayed out manner or in a blurred manner may be configured, for example, to perform an image processing using well-known filters.

When it is determined that the login user is not a service person (S46: NO), the control proceed to S49. As described above, according to the present embodiment, when the administrator or the general user is logging in on the EWS screen, it is determined that the remote display control for the purpose of the remote support is not executed, and therefore, display of the remote screen 310 is not restricted. Therefore, in S49, the controller 11 the web page data which includes the generated raster data as it is. In other words, the web page data generated in S49 is the web page data allowing the browser to display the remote screen 310 corresponding to the preview screen. It is noted that, when the controller 11 determines that the preview screen is not displayed (S47: NO), the control proceeds to S49, and generates the web page data which does not restrict the display of the remote screen 310.

When S48 or S49 is completed, the control proceeds to S50. When proceeding to S50 via S48, the controller 11 transmits the web page data including the raster data with display restrictions together with the HTTP(S) response to the serviceperson's PC 40 as the destination. As a result, when receiving the web page data and the HTTP(S) response, the service person's PC 40 analyzes the web page data. Then, depending on the result of the analysis, the controller 11 displays the raster data included in the web page on the browser. When the controller 11 proceeds to S50 via S49, the controller 11 transmits the web page data including the raster data without display restrictions to any of the destination PCs 30, 31, and 40 together with the HTTP(S) response.

When the remote screen 310 has already been displayed on the PC that requested the remote display control as S50 is executed, a request with operation coordinates is sent to the MFP 10 in response to the user operating an icon on the remote screen 310 displayed on the PC. Therefore, when the HTTP(S) request is a request with operation coordinates (S40: YES), the controller 11 proceeds to S42. In S42, the controller 11 analyzes whether the operation coordinates are within the area of the operation icons on the remote screen 310. In S42, for example, a table recording the correspondence between the operation coordinates and the area of the operation icon contained in the remote screen 310 may be stored in the memory 12, and the controller 11 may analyze the relationship between the operation coordinates and the area of the operation icon by referring to the table.

When the operation coordinates are not within the area of any of the operation icons (S43: NO), the operation on the remote screen 310 is not an operation to update the remote screen 310 and the process of FIG. 7 is terminated once. On the other hand, when the operation coordinates are within the area of any of the operation icons (S43: YES), the controller 11 proceeds to S44 to update the operation screen displayed on the user I/F 17 according to the operation of the operation icon corresponding to the operation coordinate. As a result, the operation screen displayed on the user I/F 17 of the MFP 10 is updated according to the operation of the operation icon on the remote screen 310.

In S45, the controller 11 generates the raster data according to the operation screen updated in S44. Then, in S46, the controller 11 determines whether the user logging in to the EWS screen is the serviceperson. When it is determined that the user logging in to the EWS screen is the serviceperson (S46: YES), the controller 11 proceeds to S47 to determine whether the screen currently displayed on the user I/F 17 is a preview screen. When it is determined that the currently displayed screen is the preview screen (S47: YES), the controller 11 proceeds to S48, modifies the raster data generated in S45 to restrict the display using the restriction parameter, and generates web page data that includes the modified raster data. When it is determined in that the user logging in to the EWS screen is not the serviceperson (S46: NO) or the currently displayed screen is not the preview screen (S47: NO), the controller 11 proceeds to S49 and generates the webpage data that includes the raster data generated in S45 as it is. In S50, the controller 11 transmits the web page data generated in S48 or S49 to one of the destination PCs 30, 31 and 40 together with the HTTP(S) response.

According to the above-described embodiment, the following effects can be achieved. The controller 11 of the MFP 10 is configured to receive a remote support request from the serviceperson's PC 40 via the communication I/F 16. The remote support request is a request for an operation support to the MFP 10. In response to receipt of the remote support request, the controller 11 executes the remote display control for support, which is a remote display control to send the web page data to the MFP 10. The web page data is data for displaying the remote screen for support, which reproduces the operation screen currently displayed on the user I/F 17 on the browser of the serviceperson's PC 40. By checking the remote screen 310 for support displayed on the browser, the serviceperson operating the serviceperson's PC 40 can grasp an operation status of the MFP 10 by the user. This enables effective support for the operation of the MFP 10 by the user.

In the remote display control, the controller 11 generates raster data. The raster data is data for displaying the remote screen 310 on the browser of the serviceperson's PC 40. The raster data includes a plurality of operation icons. The controller 11 transmits the web page data including the raster data to the serviceperson's PC 40. Then, when the controller 11 receives information indicating that an operation icon has been operated from the serviceperson's PC 40 that has received the web page data via the communication I/F 16, the controller 11 updates the operation screen displayed on the user I/F 17 according to the received information. Then, the controller 11 generates raster data corresponding to the updated operation screen, and transmits the web page data including the generated raster data to the serviceperson's PC 40. In the remote display control for support, when receiving a remote support request, the controller 11 generates raster data for displaying the remote screen 310 for support, and transmits web page data including the generated raster data for displaying the remote screen 310 for support to the serviceperson's PC 40 as the remote data. As a result, the operation screen displayed on the MFP 10 can be updated corresponding to the operation of the remote screen 310 on the serviceperson's PC 40. Accordingly, more effective support can be provided to the users of the MFP 10.

The controller 11 performs the obtaining process to obtain the restriction parameters that define the restriction of the display contents on the remote screen for support. In the remote display control for support, the controller 11 transmits the remote data according to the restriction parameters to the serviceperson's PC 40 to display the remote screen for support with restricted display contents on the browser. As a result, the display content of the remote screen for support displayed on the browser of the serviceperson's PC 40 is restricted according to the restriction parameters. Therefore, even in a case where the operation screen displayed on the MFP 10 is displayed on a remote PC, the display content of the remote screen for support is restricted. Accordingly, lowering of the security level can be suppressed.

The controller 11 receives the input of the restriction parameters from the administrator of the MFP 10, while it does not receive the input of the restriction parameters from anyone other than the administrator. In the remote display control, the controller 11 transmits the web page data corresponding to the restriction parameters as received to the PC 40 for the serviceperson. In this way, since the restriction parameters are obtained only by an operation by the administrator of the MFP 10, lowering of the security level can be suppressed compared to a case where the restriction parameters are changed by an unspecified number of persons.

The restriction parameters are set in association with purpose information which represents an object of the remote display control. Therefore, in the remote display control, the controller 11 obtains the purpose information from the serviceperson's PC 40 along with the request for the remote display control. Then, the controller 11 transmits the web page data according to the set restriction parameters to the serviceperson's PC 40 when the restriction parameters are set in the obtained purpose information. In this way, whether or not to restrict the display of the remote screen can be switched according to the purpose of the remote display control. Therefore, it is possible to differentiate the security level in accordance with the purpose of the remote display control.

The restriction parameters are set in association with identification information that identifies the particular user of the serviceperson's PC 40. In the remote display control, the controller 11 obtains the identification information from the serviceperson's PC 40 along with the request for the remote display control, and transmits the web page data according to the set restriction parameters to the serviceperson's PC 40 when the restriction parameters are set in the obtained identification information. In this way, it is possible to set restriction parameters only for a particular user. Accordingly, the security level can be differentiated for each user who refers to the remote screen.

The controller 11 performs the remote display control of displaying the remote screen 310 reproducing the operation screen displayed on the user I/F 17 on the browser of the serviceperson's PC 40 by transmitting the web page data to the serviceperson's PC 40 through the communication I/F 16. In the remote display control performed, as the controller 11 transmits the web page data in accordance with the restriction parameters to the serviceperson's PC 40, the display content of the remote screen 310 to be displayed on the browser is restricted. Thus, even when the operation screen displayed on the MFP 10 is displayed on a remote PC, since the display content of the remote screen is restricted, lowering of the security level can be suppressed.

In the remote display control, the controller 11 generates raster data. The raster data is data for displaying the remote screen 310 on the browser of the serviceperson's PC 40. The raster data includes a plurality of operation icons. The controller 11 transmits the web page data including the raster data to the serviceperson's PC 40. Accordingly, since the web page data transmitted to the serviceperson's PC 40 includes the raster data in which the display content is restricted in accordance with the restriction parameters, in a configuration that the operation screen displayed on the MFP 10 is updated in accordance with an operation on the remote screen 310 of the serviceperson's PC 40, the display content to be displayed on the remote screen 310 of the serviceperson's PC 40 can be restricted.

When the user ID indicates the logged in user of the MFP 10, the controller 11 transmits, to the general user's PC 30, the web page data used for displaying the remote screen 310 in which the display content is not restricted on the browser. With this configuration, with respect to the logged in user, the remote screen 310 in which the display content is not restricted is displayed on the serviceperson's PC 40. Accordingly, for example, when the user logging in the MFP 10 wishes the PC 30 to display the remote screen 310, the remote screen 310 in which the display content is not restricted can be displayed on the PC 30.

The purpose information includes information indicating a purpose of supporting operation of the MFP 10 through the remote screen, and the restriction parameters are set in association with the purpose information indicating the purpose of supporting the operation of the MFP 10. Therefore, in a state where the remote display control is performed for purpose of supporting the operation of the MFP 10 by a remote PC, since the display content displayed on the remote PC is restricted, lowering of the security level can be suppressed when the high security is required.

Modification of First Embodiment

The display restriction to the remote screen 310 may be performed by a process on the serviceperson's PC 40 side. In such a case, in S48 of FIG. 7, the controller 11 transmits information for restricting the display content of the raster data according to the restriction parameters to the serviceperson's PC 40 along with the raster data, instead of generating the web page data with restrictions. The browser of the serviceperson's PC 40 may analyze the information according to the restriction parameters, and apply a process of display restriction to the raster data according to the analysis results.

Second Embodiment

Next, a second embodiment will be described. In the following description regarding the second embodiment, a configuration that differs from the first embodiment will be mainly described. Components assigned with the same reference numbers as in the first embodiment indicate the same ones, and the description thereof will not be repeated.

Figure 10:
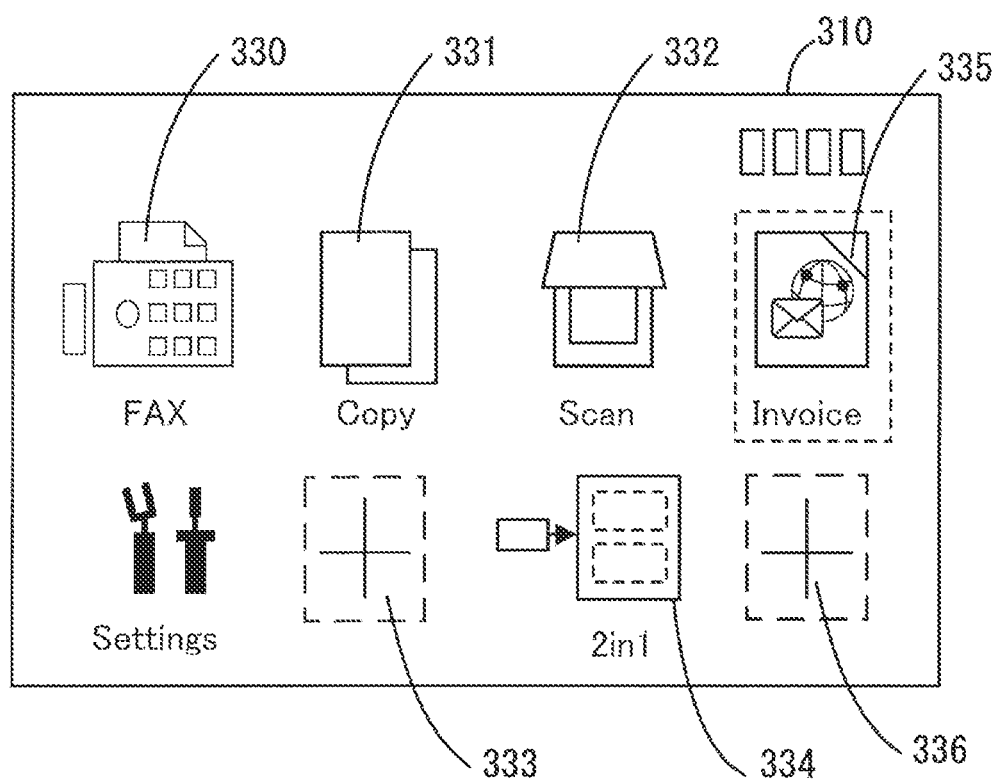
FIG. 10 illustrates a remote screen according to a second embodiment.

In the present embodiment, the restriction parameters are set to correspond to the operation screen displayed on the user I/F 17. FIG. 10 shows a remote screen 310, among a plurality of screens, corresponding to a standby screen. The remote screen 310 shown in FIG. 10 includes a shortcut icon 330 representing the "facsimile operation," a shortcut icon 331 representing the "copy operation," a shortcut icon 332 representing the "Scan operation," and a shortcut icon 334 representing the "2-in-1 copy" and a shortcut icon 335 representing a "particular paper copy." In the present embodiment, the particular paper copy is an operation of copying an invoice. It is noted that the particular paper copy may be a function to copy a paper or card with a high security level, such as a car license, a passport, an insurance card, etc. in addition to the invoice. The remote screen 310 also includes unregistered icons 333 and 336.

In the present embodiment, when the remote display control is performed, the display of the remote screen 310 is restricted in response to the shortcut icon 335 being operated on the standby screen displayed on the user I/F 17.

Figure 11:
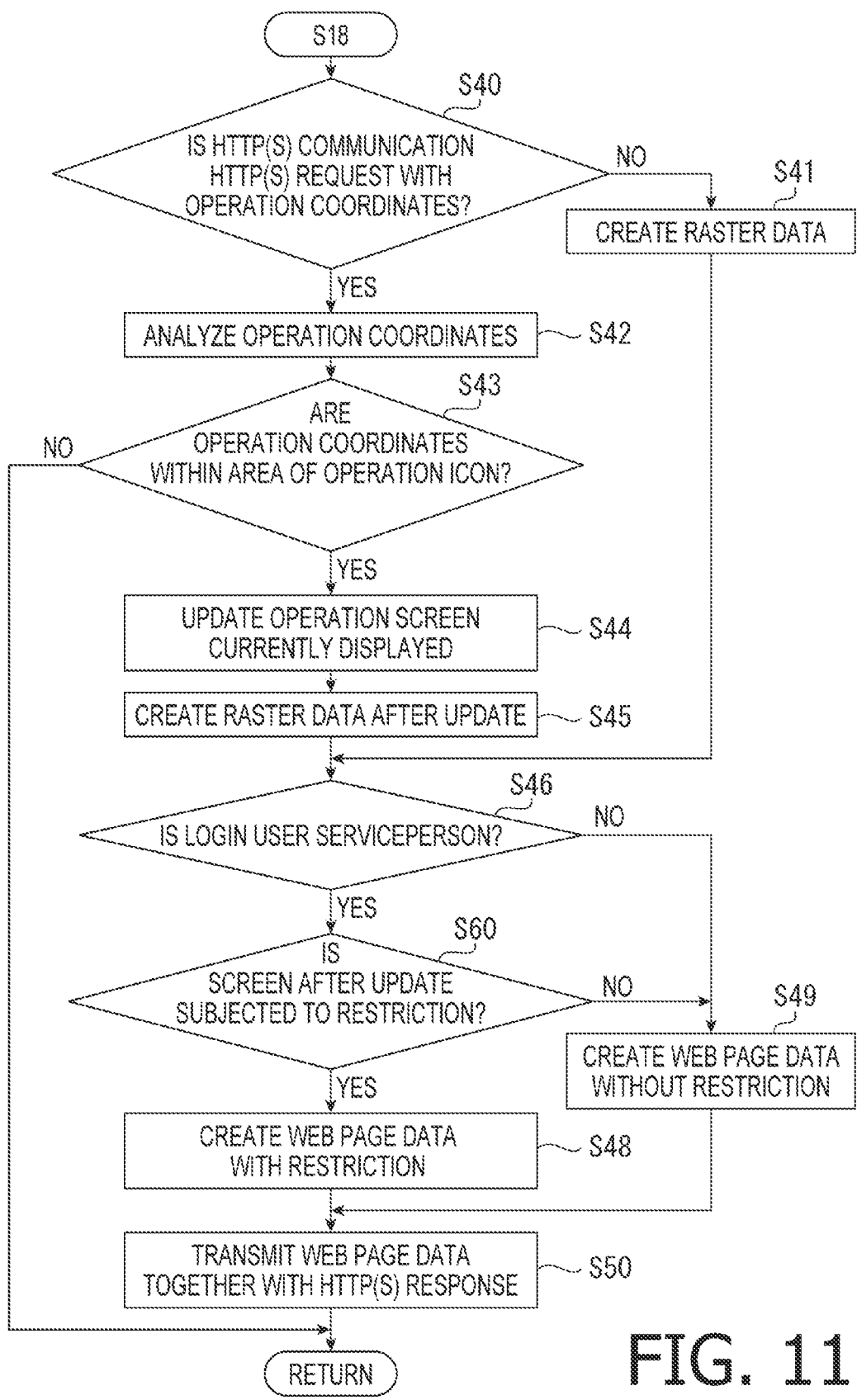
FIG. 11 is a flowchart illustrating another process performed in S18 of FIG. 2.

FIG. 11 shows a display allowing process (the display control process) performed in S18 of FIG. 2. In S41 or S45, the controller 11 generates the raster data corresponding to the operation screen displayed on the user I/F 17. In S46, the controller 11 determines whether the login user for the EWS screen is the serviceperson or not. When the login user is the serviceperson (S46: YES), the controller 11 proceeds to S60. When the login user is an administrator or a general user (S46: NO), the controller 11 proceeds to S49 also in the second embodiment.

In S60, the controller 11 determines whether the screen updated by the operation of the shortcut icon on the user I/F 17 is subject to the display restriction for the remote screen 310. In the second embodiment, when the shortcut icon 335 designating the particular paper copy is operated (S60: YES), the controller 11 proceeds to S48. In S48, the controller 11 modifies the generated raster data to restrict the display according to the restriction parameter and generates web page data including the modified raster data. On the other hand, when the shortcut icon 335 is not operated (S60: NO), the controller 11 proceeds to S49. In S49, the controller 11 generates the web page data containing the generated raster data as it is.

According to the present embodiment, for each of the shortcut icons subjected to be operated, a restriction parameter is stored in the SFL list stored in the memory 12. Therefore, in S48, the controller 11 retrieves the restriction parameter associated with the shortcut icon operated on the remote screen 310 by referring to the SFL list stored in the memory 12. Optionally, the restriction parameter may be retrieved from an item of the SFL list referred to according to the login user of MFP 10 in S21 of FIG. 2. In such a case, in the SFL list stored in the memory 12, the shortcut icons subjected to the display restriction and the control parameters may be stored for each login user of the MFP 10.

According to the present embodiment, the following effects can be achieved. The restriction parameters are set corresponding to the operation screen displayed on the user I/F 17, and the controller 11 is configured to transmit, in the remote display control, remote data corresponding to the set restriction parameters to the serviceperson's PC 40 when the restriction parameters are set for the operation screen after switching. Therefore, the display content to be restricted only to the particular operation screen among the operation screens after switching.

Third Embodiment

Hereinafter, a third embodiment will be described. In the description regarding the third embodiment, the configuration that differs from the first embodiment will be mainly described. The components assigned with the same reference numbers as in the first embodiment indicate the same components, and the description thereof will not be repeated.

In the first and second embodiments described above, the display restrictions on the remote screen 310 are performed according to the restriction parameters. Instead, according to the third embodiment, a display-restricted area on the remote screen 310 is differentiated according to the restriction parameters. Concretely, in the SFL list L1, the display-restricted area on the remote screen 310 is set in correspondence with the login ID. In the third embodiment, when an address book is displayed as the remote screen 310, an address display area included in the address book is restricted.

Figure 7:
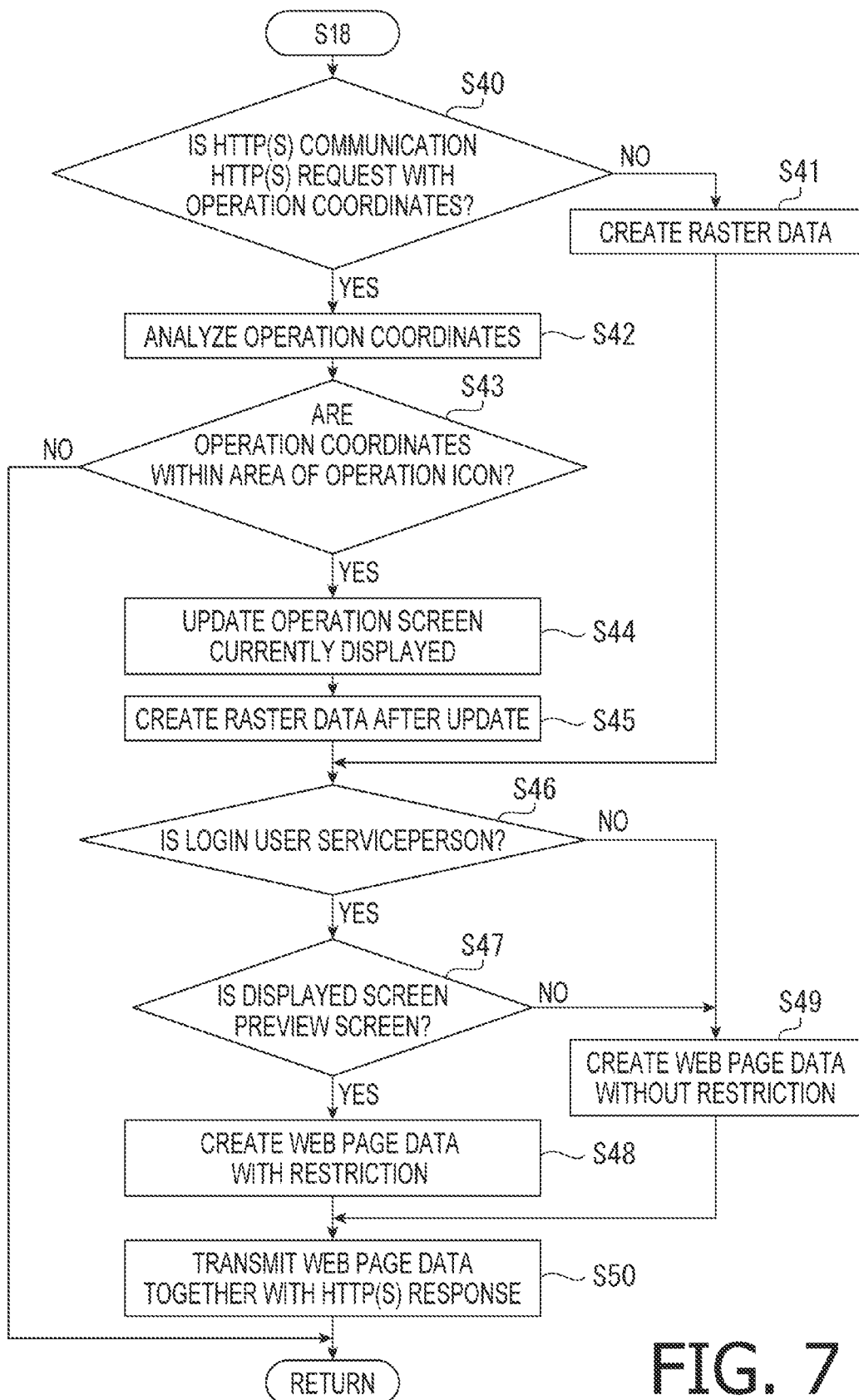
FIG. 7 is a flowchart illustrating a process performed in S18 of FIG. 2.

Also in this case, when the address book is displayed as the remote screen 310 in S47 of FIG. 7, the controller 11 proceeds to S48. Then, the controller 11 transmits the web page data in which the display of a particular area is restricted according to the restriction parameters set for the login user of the MFP 10 to the serviceperson's PC 40. As an example of the restriction, in the address book, grayed-out display or blurring is applied to the area where addresses are assumed to be displayed.

According to the third embodiment described above, since the area to be restricted from display on the remote screen 310 can be set for each user, a security-enhanced area on the remote screen 310 can be set for each user.

Other Embodiments

Aspects of the present disclosures are not necessarily be limited to the configurations of the above embodiments, and various modifications can be made without departing from the aspects of the present disclosures. In each of the embodiments described above, the display of the remote screen 310 is restricted when a purpose of the remote display control is the remote support. Alternatively, the display of the remote screen 310 may be uniformly restricted regardless of the purpose of the remote display control. In such a case, the process of S46 in FIG. 7 may be deleted.

In each of the above-mentioned embodiments, the MFP 10 is used as an example of the image forming device. However, the image forming device is not necessarily be limited to the MFP 10, but a stand-alone printer, a scanner or a copier.

It is noted that the MFP 100 is an example of an image forming device according to aspects of the present disclosures, and the PCs 30, 31, 40 are examples of an information processing device according to aspects of the present disclosures. A copy operation combining a print operation by the printer engine 13 and a scan operation by the scanner engine 14 is an example of a compound operation. The web page data in the first embodiment is an example of remote data according to aspects of the present disclosures. In the present embodiment, the process performed by the controller 11 in S22 is an example of the obtaining process. In the present embodiment, the service request is an example of a support request according to aspects of the present disclosures. In the present embodiment, S26 executed by the controller 11 is an example of a support start request process according to aspects of the present disclosures. In the present embodiment, S16 and S33 executed by the controller 11 are examples of the receiving process according to aspects of the present disclosures. In the present embodiment, the login ID indicating the serviceperson and the IP address of the PC 40 for the serviceperson are examples of the purpose information according to aspects of the present disclosures. In the second embodiment, the shortcut icon is an example of a shortcut image. In the present embodiment, information for determining (S46, S47 or S60) whether to generate the web page data which includes the generated raster data as it is (S49) or generate the web page data including the modified raster data (S48) is an example of decision information.

What is claimed is:

1. An image forming device, comprising:
a memory;
a communication interface;
a user interface; and
a controller,
wherein the controller is configured to perform a remote display control comprising:
transmitting remote data to an information processing device through the communication interface, the remote data being data making the information processing device display a remote screen reproducing an operation screen to be displayed on the user interface, the remote screen displayed on the information processing device being configured to receive identification information identifying a user logging in the image forming device, the remote screen having display content according to a display mode, the remote data being data making the information processing device display the remote screen reproducing the operation screen to be displayed on the user interface when the display mode is a first mode, the remote data being data making the information processing device display the remote screen reproducing a restricted screen when the display mode is a second mode, the restricted screen being a screen in which part of the operation screen to be displayed on the user interface is restricted;
obtaining the identification information and storing the obtained identification information in the memory; and
determining the display mode based on which user the identification information stored in the memory identifies, the display mode being determined to be the first mode when the identification information identifies a first user, the display mode being determined to be the second mode when the identification information identifies a second user.

2. The image forming device according to claim 1, wherein the controller is configured to perform:
in response to receipt of a remote support request through the communication interface in the obtaining, determining whether a support mode is to be the display mode in the determining, the remote screen request being a request for an operation support for the image forming device; and
when determining that the support mode is to be the display mode in the determining, transmitting support screen data, the support screen data being data making the information processing device display a support screen, the support screen being a screen including display content for the support mode, the display content for the support mode being a content reproducing an operation screen, the operation screen being a screen currently displayed on the user interface, the support screen data being data used for displaying the support screen.

3. The image forming device according to claim 2, wherein the controller is configured to perform:
transmitting a start request for the operation support to the information processing device; and
receiving the remote support request from the information processing device, the remote support request being a request replied by the information processing device in response to the start request.

4. The image forming device according to claim 2, wherein the controller is configured to perform:
generating raster data to be used to display the remote screen on the information processing device, the raster data including a plurality of operation icons;
transmitting a web page data including the raster data to the information processing device;
in a case where receiving from the information processing device which has received the web page data through the communication interface, updating the operation screen displayed on the user interface based on the received information, the received information representing that the at least one of the plurality of operation icons is operated;

generating the raster data corresponding the updated operation screen; and transmitting the web page data including the generated raster data to the information processing device, wherein, in the remote display, the controller is configured to:

in a case where receiving the remote support request, generating the raster data used to display the support screen as the remote screen; and transmit, as the remote data, the web page data including the raster data used to display the support screen.

5. The image forming device according to claim 2, wherein the controller is configured to perform:

obtaining a restriction parameter, the restriction parameter setting restriction of a display content of the support screen; and in the remote display control, displaying the support screen in which the display content is restricted on the information processing device by transmitting the remote data in accordance with the restriction parameter.

6. The image forming device according to claim 5, wherein the controller is configured to perform:

in the remote display control, obtaining purpose information with the request for the operation support from the information processing device, the purpose information representing an object of the remote display control; and in a case where the obtained purpose information represents the request for the operation support, transmitting the remote data in accordance with the restriction parameter to the information processing device.

7. The image forming device according to claim 5, wherein the restriction parameter is set in association with identification information, the identification information identifying a particular user of the information processing device, and wherein, in the remote display control, the controller is configured to perform:

receiving the identification information with the request for the operation support from the information processing device; and in a case where the restriction parameter is set to the obtained identification information, transmitting the remote data in accordance with the set restriction parameter.

8. The image forming device according to claim 5, wherein the restriction parameter is set in association with the operation screen, and wherein the controller is configured to perform:

switching the operation screen displayed on the user interface in accordance with an operation through an input interface of the image forming device; and in the remote display control, in a case where the restriction parameter is set the switched operation scree, transmitting the remote data in accordance with the set restriction parameter.

9. The image forming device according to claim 8, wherein the controller is configured to perform:

setting a shortcut icon image on the operation screen, the shortcut icon image being used to receive a designation operation of switching the operation screen; and in the remote display control, in a case where the restriction parameter is set to the designated shortcut icon image, transmitting the remote data in accordance with the set restriction parameter to the information processing device.

10. The image forming device according to claim 9, wherein the controller is configured to perform, in accordance with an operation received through the input interface, setting the shortcut icon image on the operation screen in accordance with a purpose.

11. The image forming device according to claim 5, wherein the controller is in a log-in state in accordance with an operation received through the input interface, wherein the controller is configured to perform:

setting the restriction parameter in association with a logged in user of the image forming device in the obtaining of the restriction parameter; and in the remote display control, in a state where the restriction parameter is set to the logged in user, transmitting the remote data in accordance with the set restriction parameter to the information processing device.

12. The image forming device according to claim 11, wherein, in the obtaining of the restriction parameter, display of an area in the support screen is controllable in accordance with the restriction parameter for each logged in user, and wherein, in the remote display control, the controller is configured to perform transmitting the remote data in accordance with the restriction parameter to the information processing device, display of an area indicated by the restriction parameter being restricted in the displayed support screen.

13. The image forming device according to claim 12, wherein the controller is configured to perform:

in the obtaining of the restriction parameter, receiving an input of the restriction parameters from an administrator of the image forming device, while not receiving an input of the restriction parameters from anyone other than the administrator; and in the remote display control, transmitting the remote data in accordance with the input restriction parameter to the information processing device.

14. The image forming device according to claim 12, wherein the restriction parameter is set in association with identification information, the identification information identifying a particular user of the information processing device, and wherein, in the remote display control, the controller is configured to perform:

receiving the identification information with the request for the remote display control from the information processing device; and in a case where the restriction parameter is set to the obtained identification information, transmitting the remote data in accordance with the set restriction parameter.

15. The image forming device according to claim 12, wherein the controller is in a log-in state in accordance with an operation received through the user interface, wherein, in the remote display control, the controller is configured to perform transmitting the remote data to the information processing device in a case where the identification information indicates a logged in user of the image forming device, the remote data to be transmitted being used to display the remote screen on the information processing device, the display content of the remote screen to be displayed being not restricted.

16. The image forming device according to claim 12,
wherein the restriction parameter is set in association with purpose information representing an object of the remote display control,
wherein the controller is configured to perform:
  in the remote display control, obtaining the purpose information with the request for the remote display control from the information processing device; and
  in a case where the restriction parameter is set to the obtained purpose information, transmitting the remote data in accordance with the set restriction parameter to the information processing device.

17. The image forming device according to claim 16,
wherein the purpose information includes information indicating a purpose of supporting an operation of the image forming device through the remote screen,
wherein the restriction parameter is set in association with the information indicating the purpose of supporting.

18. The image forming device according to claim 17,
wherein, in the remote display control, the controller is configured to:
  transmitting a support request to the information processing device through the communication interface; and
  in a case where receiving a request of the remote display control from the information processing device in response to the support request, transmitting the remote data to the information processing device, the remote data being a remote screen reproducing the operation screen currently displayed, the remote data being transmitted in accordance with the restriction parameter.

19. The image forming device according to claim 12,
wherein the controller is in a log-in state in accordance with an operation received through the user interface,
wherein the controller is configured to perform:
  setting the restriction parameter in association with a logged in user of the image forming device in the obtaining of the restriction parameter; and
  in the remote display control, in a state where the restriction parameter is set to the logged in user, transmitting the remote data to the information processing device, the remote data being transmitted in accordance with the set restriction parameter.

20. The image forming device according to claim 19,
wherein, in the obtaining of the restriction parameter, the controller is configured to set an area in the remote screen for each logged in user, the set area being an area in which display is to be restricted based on the restriction parameter, and
wherein, in the remote display control, the controller is configured to perform transmitting the remote data in accordance with the restriction parameter to the information processing device, display of the set area being restricted in the remote screen to be displayed.

21. The image forming device according to claim 1,
wherein the controller is configured to perform:
  in response to receipt of a restriction parameter in the obtaining, determining whether a restriction mode is to be the display mode in the determining, the restriction parameter setting restriction of a display content of the support screen; and
  when determining that the restriction mode is to be the display mode in the determining, displaying restricted screen on the information processing device by transmitting restricted screen data, the restricted screen being a screen including display content for the restriction mode, the display content for the restriction mode being a content reproducing an operation screen, the display content for the restriction mode being reproduced by omitting a part of the content of the operation screen, the operation screen being a screen currently displayed on the user interface, the restricted screen data being data used for displaying the restricted screen.

22. The image forming device according to claim 21,
wherein, in the remote display control, the controller is configured to perform:
  generating raster data to be used to display the remote screen on the information processing device, the raster data including a plurality of operation icons;
  transmitting a web page data including the raster data to the information processing device, the web page data being transmitted as the remote data;
  in a case where receiving information from the information processing device which has received the web page data through the communication interface, updating the operation screen displayed on the user interface based on the received information, the received information representing that the at least one of the plurality of operation icons is operated;
  generating the raster data corresponding the updated operation screen; and
  transmitting the web page data including the generated raster data to the information processing device, and
wherein the web page data includes one of information for restricting a display content of the raster data in accordance with the restriction parameter and the raster data of which the display content is restricted in accordance with the restriction parameter.

23. The image forming device according to claim 1,
wherein the identification information is input to the information processing device through the remote screen, and
wherein the controller is configured to perform obtaining the identification information from the information processing device through the communication interface.

24. The image forming device according to claim 1,
wherein the controller is configured to perform storing, in the memory, restriction information based on a user input on the user interface, the user input being designation of a type of restriction on the remote screen, and
wherein the remote data, which is transmitted in the remote display control when the display mode is the second mode, is data making the information processing device display the remote screen reproducing the restricted screen, the restricted screen being a screen in which part of the operation screen to be displayed on the user interface is restricted according to the restriction information.

25. The image forming device according to claim 1,
wherein the controller is configured to perform displaying, on the user interface, a preview screen of a document image,
wherein, when the display mode is determined to be the first mode in the determining while the preview screen is displayed, the remote data, which is transmitted in the remote display control, is data making the information processing device display the remote screen of the preview screen, and
wherein, when the display mode is determined to be the second mode in the determining while the preview screen is displayed, the remote data, which is transmitted in the remote display control, is data making the information processing device display the remote screen of the preview screen with particular part of the document image included in the preview screen is restricted.

26. The image forming device according to claim 1, wherein the remote data, which is transmitted in the remote display control when the display mode is the second mode, is data making the information processing device display the remote screen reproducing the restricted screen, the restricted screen being a screen in which part of the operation screen to be displayed on the user interface is displayed in at least one of a blurred manner and a gray out manner according to a user selection input to the user interface.

27. An image forming device, comprising:
a communication interface;
a user interface; and
a controller,
wherein the controller is configured to perform a remote display control comprising:
transmitting remote data to an information processing device through the communication interface, the remote data being data making the information processing device display a remote screen reproducing an operation screen to be displayed on the user interface, the remote screen having display content of a display mode, the remote data being data making the information processing device display the remote screen;
obtaining decision information;
determining the display mode based on the obtained decision information, the display mode being a mode of displaying the display content on the remote screen;
obtaining a restriction parameter, the restriction parameter setting restriction of the display content of the remote screen;
setting a shortcut icon image on the operation screen, the shortcut icon image being used to receive a designation operation of switching the operation screen; and
in a case where the restriction parameter is set to the shortcut icon image designated by the designation operation, transmitting the remote data in accordance with the set restriction parameter to the information processing device.

28. An image forming device, comprising:
a communication interface;
a user interface; and
a controller, the controller being in a log-in state in accordance with an operation received through the input interface,
wherein the controller is configured to perform a remote display control comprising:
transmitting remote data to an information processing device through the communication interface, the remote data being data making the information processing device display a remote screen reproducing an operation screen to be displayed on the user interface, the remote screen having display content of a display mode, the remote data being data making the information processing device display the remote screen,;
obtaining decision information;
determining the display mode based on the obtained decision information, the display mode being a mode of displaying the display content on the remote screen;
obtaining a restriction parameter, the restriction parameter setting restriction of the display content of the remote screen;
setting the restriction parameter in association with a logged in user of the image forming device in the obtaining of the restriction parameter; and
in a state where the restriction parameter is set to the logged in user, transmitting the remote data in accordance with the set restriction parameter to the information processing device.

* * * * *

UNITED STATES PATENT AND TRADEMARK OFFICE
CERTIFICATE OF CORRECTION

| | |
|---|---|
| PATENT NO. | : 11,729,325 B2 |
| APPLICATION NO. | : 17/399306 |
| DATED | : August 15, 2023 |
| INVENTOR(S) | : Kentaro Iwatsuka |

It is certified that error appears in the above-identified patent and that said Letters Patent is hereby corrected as shown below:

In the Claims

Column 16, Claim 2, Line 32 should read:
mode in the determining, the remote support request
Column 16, Claim 4, Line 59 should read:
transmitting web page data including the raster data
Column 16, Claim 4, Line 61 should read:
in a case of receiving from the information pro-
Column 17, Claim 4, Line 7 should read:
in a case of receiving the remote support request,
Column 17, Claim 8, Lines 56-57 should read:
restriction parameter is set to the switched operation
screen, transmitting the remote data in accordance
Column 19, Claim 18, Line 25 should read:
in a case of receiving a request of the remote
Column 19, Claim 21, Line 64 should read:
display mode in the determining, displaying a restricted
Column 20, Claim 22, Line 15 should read:
transmitting web page data including the raster data
Column 20, Claim 22, Line 18 should read:
in a case of receiving information from the infor-
Column 21, Claim 25, Line 4 should read:
document image included in the preview screen being Signed and Sealed this
Twenty-eighth Day of November, 2023

Katherine Kelly Vidal
*Director of the United States Patent and Trademark Office*